(12) United States Patent
Sharrah et al.

(10) Patent No.: US 7,891,833 B2
(45) Date of Patent: Feb. 22, 2011

(54) RECHARGEABLE FLASHLIGHT AND BATTERY ASSEMBLY FOR SINGLE-HANDED INTERMITTENT AND CONTINUOUS OPERATION

(75) Inventors: Raymond L Sharrah, Collegeville, PA (US); Peter J. Ziegenfuss, Sellersville, PA (US)

(73) Assignee: Streamlight, Inc., Eagleville, PA (US)

( * ) Notice: Subject to any disclaimer, the term of this patent is extended or adjusted under 35 U.S.C. 154(b) by 385 days.

(21) Appl. No.: 11/751,606

(22) Filed: May 21, 2007

(65) Prior Publication Data

US 2007/0253194 A1 Nov. 1, 2007

Related U.S. Application Data

(63) Continuation of application No. 10/753,216, filed on Dec. 19, 2003, now Pat. No. 7,220,013.

(51) Int. Cl.
*F21L 4/00* (2006.01)
(52) U.S. Cl. ............... 362/183; 362/157; 362/191; 362/202; 362/206; 429/7; 429/99; 429/170
(58) Field of Classification Search .......... 362/157, 362/158, 171, 178, 183, 184, 191, 202, 206; 429/7, 99, 170
See application file for complete search history.

(56) References Cited

U.S. PATENT DOCUMENTS

| | | | |
|---|---|---|---|
| 5,432,689 A | 7/1995 | Sharrah et al. | |
| 5,486,432 A | 1/1996 | Sharrah et al. | |
| 5,590,951 A | 1/1997 | Matthews | |
| 5,629,105 A | 5/1997 | Matthews | |
| 5,642,932 A | 7/1997 | Matthews | |
| 6,046,572 A | 4/2000 | Matthews | |
| 6,283,611 B1 | 9/2001 | Sharrah et al. | |
| 6,461,764 B1 | 10/2002 | Nakamura | |
| 6,585,391 B1 | 7/2003 | Koch et al. | |
| 7,186,002 B2 | 3/2007 | Matthews et al. | |
| 2003/0137834 A1* | 7/2003 | Jigamian et al. | 362/205 |
| 2005/0128741 A1* | 6/2005 | Matthews et al. | 362/206 |
| 2005/0280393 A1* | 12/2005 | Feldmann | 320/114 |

FOREIGN PATENT DOCUMENTS

EP 347065 12/1989

\* cited by examiner

*Primary Examiner*—Sandra L O Shea
*Assistant Examiner*—Meghan K Dunwiddie
(74) *Attorney, Agent, or Firm*—Stephen H. Eland; Dann, Dorfman, Herrell & Skillman

(57) ABSTRACT

A rechargeable flashlight is also provided. The flashlight includes a housing having a battery compartment and a light source adjacent a first end of the housing. A rechargeable lithium-ion battery provides power for the flashlight. A controller circuit serially connected with the battery is operable to control the flow of electricity to and from the battery. Specifically, the controller circuit is operable to disconnect the lithium-ion battery cell from the light source in response to the charge in the lithium-ion battery depleting below a pre-determined lower threshold. The control circuit is further operable to disconnect the lithium-ion battery cell from electrical connection with the first charging contact when the lithium-ion battery is connected with a battery charger and the charge in the lithium-ion battery reaches a pre-determined upper threshold.

14 Claims, 5 Drawing Sheets

RECHARGEABLE FLASHLIGHT AND BATTERY ASSEMBLY FOR SINGLE-HANDED INTERMITTENT AND CONTINUOUS OPERATION

PRIORITY INFORMATION

This application is a continuation of U.S. application Ser. No. 10/753,216, filed Dec. 19, 2003, which is set to issue on May 22, 2007 as U.S. Pat. No. 7,220,013.

BACKGROUND

Rechargeable flashlights are known in which a flashlight containing a rechargeable battery is provided with a compatible charging unit which both holds the flashlight and charges the battery when the flashlight is positioned therein. As described in U.S. Pat. No. 5,432,689, it is desirable to provide such a flashlight and charger assembly wherein the body of the flashlight is not used as a conduction path for either side of a lamp circuit, so that mating parts of the flashlight may be provided with an anodized, enamel, or other finish, and do not require re-machining in order to provide a conductive path between finished mating parts.

In the use of flashlights by armed personnel, such as by policemen, it is desirable to provide a flashlight that can be gripped and intermittently actuated with a single hand. For example, it is desirable to provide an actuator at the rear end of such a flashlight, so that the flashlight may be gripped with the fingers of one hand, and the actuator can be operated by the thumb of the same hand. However, locating a switch mechanism at the rear end of the flashlight while maintaining a construction which does not utilize the body of the flashlight as a conducting member, and in which a continuous connection is maintained between the battery terminals and a pair of external charging contacts presents design difficulties for which no solution is suggested in the above-referenced U.S. Pat. No. 5,432,689.

SUMMARY OF THE INVENTION

In accordance with one aspect of the present invention, a rechargeable flashlight is provided in which a the flashlight is charged by two charging contacts located on or near the forward end of the flashlight. The flashlight is configured to provide intermittent single-handed operation of the lamp circuit, and optionally to provide continuous switched operation. Continuous electrical contact between respective battery terminals located at the forward end of a battery assembly, and a pair of external charging contacts, is maintained by a configuration of springs mounted to a connection member located in the forward end of the flashlight. The connection springs extend rearwardly from the connection module to maintain contact with the battery terminals, while also urging the battery assembly rearwardly within the flashlight. A spring loaded plunger located in the connection module is also biased rearwardly, and aligned with a terminal of the battery assembly and with an electrical contact on a lamp base. The tail of the flashlight includes a slide member, having an actuation surface at the rear of the flashlight, for urging the battery assembly in the forward direction within the flashlight barrel, and further urging the plunger toward the lamp base contact. Hence, intermittent operation of the lamp is provided. In a preferred embodiment, continuous operation of the lamp is provided by configuring the tail assembly to hold the slide member at a forwardly-advanced position in the rear of the barrel.

In accordance with another aspect of the present invention, a rechargeable flashlight is provided in which the flashlight includes a housing and a light source adjacent a first end of the housing. The rechargeable battery is a lithium-ion battery. A controller circuit serially connected with the battery is operable to control the flow of electricity to and from the battery. For instance, the controller circuit is operable to disconnect the lithium-ion battery cell from the light source in response to the charge in the lithium-ion battery depleting below a pre-determined lower threshold The controller circuit is also operable to disconnect the lithium-ion battery cell from electrical connection with the first charging contact when the lithium-ion battery is connected with a battery charger and the charge in the lithium-ion battery reaches a pre-determined upper threshold.

BRIEF DESCRIPTION OF THE DRAWINGS

The foregoing Summary, as well as the following Detailed Description, will be best understood in connection with the attached drawings in which.

DETAILED DESCRIPTION OF THE DRAWINGS

Figure 1:
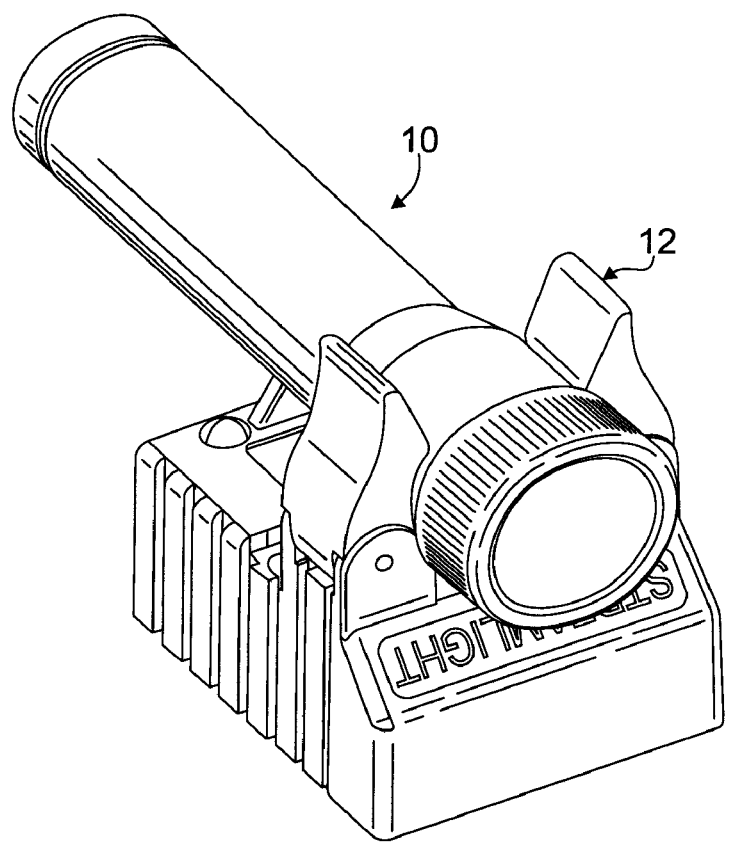
FIG. 1 is a perspective view of a flashlight and charger in accordance with the present invention.
Figure 2:
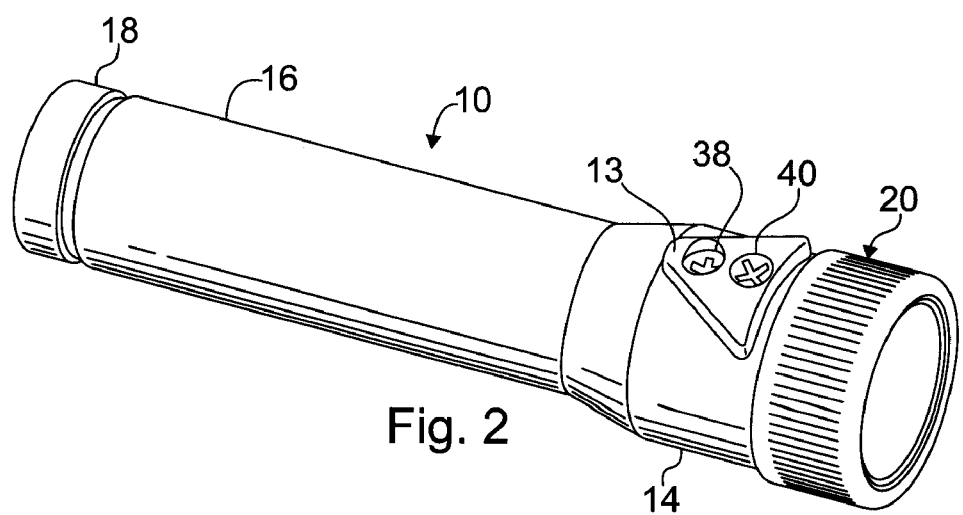
FIG. 2 is a perspective view of the flashlight of FIG. 1 removed from the charger.

Referring now to FIG. 1, the flashlight 10 is shown engaged within a charger 12. The charger 12 is substantially identical in construction with the charger shown in U.S. Pat. No. 5,432,689, which is incorporated by reference herein in connection with the charger assembly. Referring to FIG. 2, the flashlight 10 comprises a head assembly 14 connected with the forward end of a barrel 16. A tail assembly 18 is connected with the rear end of the barrel. A guide plate 13 is positioned on the exterior of the head assembly 14 for guiding the flashlight into the charger. Positioned within the guide plate are a pair of charging contacts 40 and 38, for mating with compatible connecting contacts located in the charger.

Figure 3:
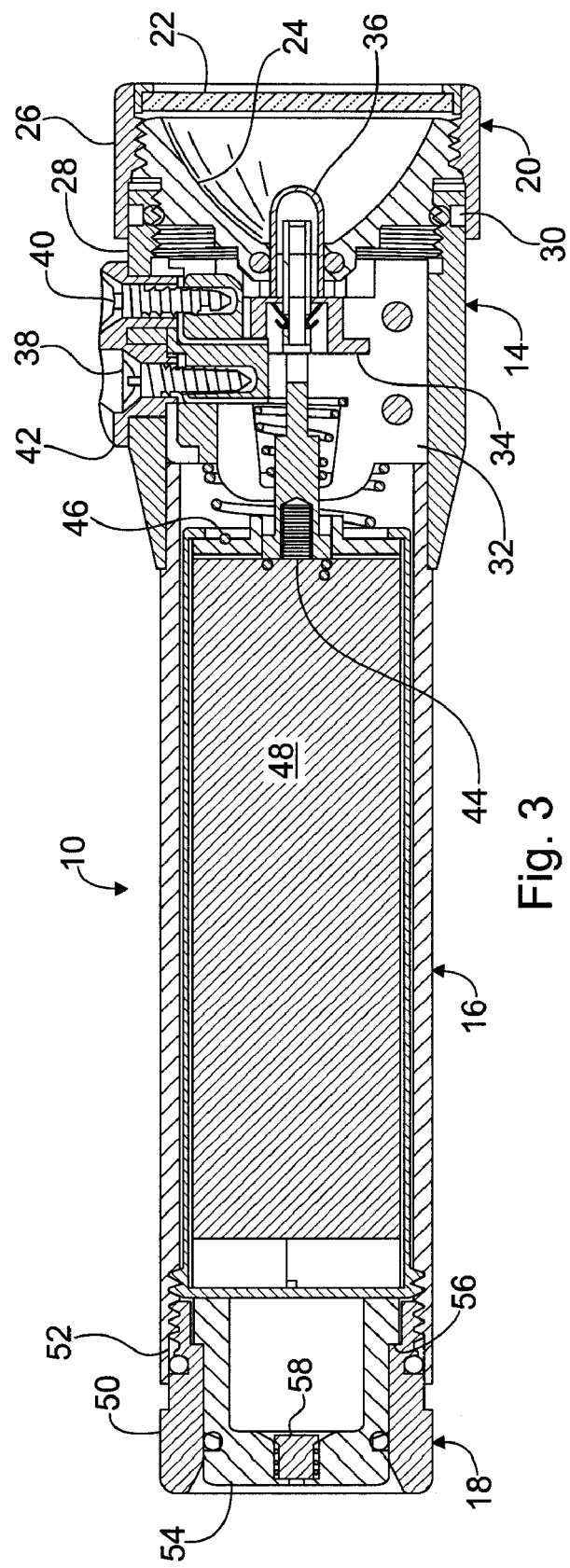
FIG. 3 is a cross-sectional view of the flashlight of the invention.

The forward end of the flashlight is formed by a facecap assembly 20 which is rotatably mounted at the forward portion of the head assembly 14. Referring now to FIG. 3, the facecap assembly 20 holds a circular lens 22 and a reflector 24 within a cylindrical carrier 26. The terminal rear portion of the reflector has threads 28 formed thereon to provide a threaded connection with a forward portion of the head assembly 14. The outer surface of the facecap assembly 20 is preferably knurled to provide a gripping surface thereon, so that the facecap assembly 20 can be rotated to move the facecap assembly 20 in the forward or reverse directions upon the threads 28 to vary the focus of the flashlight. An o-ring is positioned within a chase 30 formed about the outer surface of the forward end of the head assembly 14 to provide a fluid seal between the head assembly 14 and the facecap assembly 20.

A connection module 32 is positioned within the head assembly 14. Described in greater detail hereinbelow, the connection module 32 supports a lamp holder 34, in which a bi-pin lamp 36 may be inserted as shown. The The connection module 32 provides continuous electrical connection between battery terminals 44 and 46 and respective ones of a pair of contact screws 38 and 40, which extend from the exterior surface of the flashlight 10 through a charger alignment plate 42 and into the connection module 32 positioned in the interior of the head assembly 14. The connection module further provides a switchable electrical connection between the battery terminals 44 and 46 and respective terminals of the bi-pin lamp 36.

The rear portion of the head assembly 14 is press-fit for permanent engagement onto the forward end of the barrel 16. A battery assembly 48 is housed within the barrel 16. As described further hereinbelow, the battery assembly has respective negative and positive contacts 44 and 46 both positioned at the forward end thereof within the barrel 16.

A tail assembly 18 is connected with the rear of the barrel 16. The tail assembly comprises a cylindrical tail housing 50 having threads 52 formed about the exterior forward end thereof to provide a threaded connection with the interior rear portion of the barrel 16. A cylindrical slide member 54 is slidably positioned within the tail assembly 18. The forward end of the slide member 54 is enlarged so that the slide member is captured against rearward movement by an reduced diameter rim 56 formed in the tail housing 50. The slide member 54 is preferably hollow to provide storage space for a spare lamp (not shown), and is closed at the rear end thereof. A semi-permeable filter member 58 is positioned within a hole extending through the rear wall of the slide member 54, in order to vent gases from within the flashlight.

Figure 4:
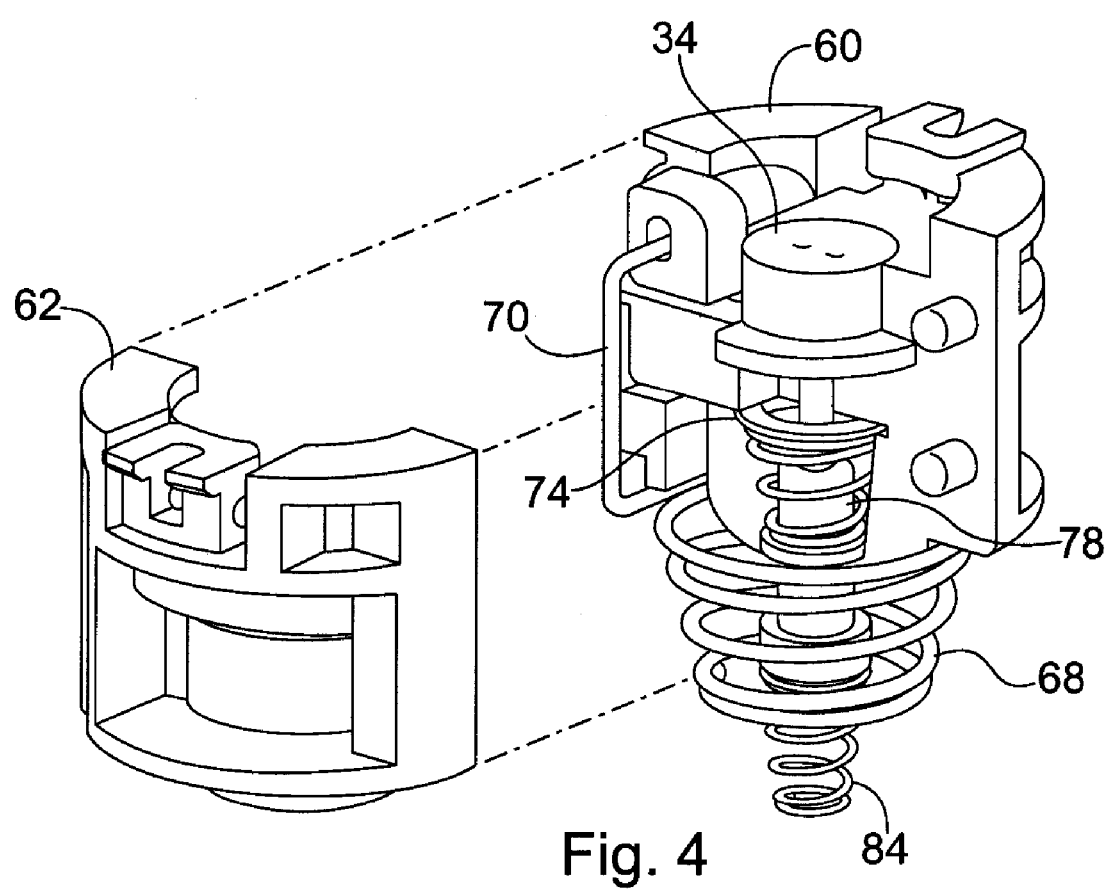
FIG. 4 is an exploded view of a connection module located within the head of the flashlight of FIG. 3.
Figure 5:
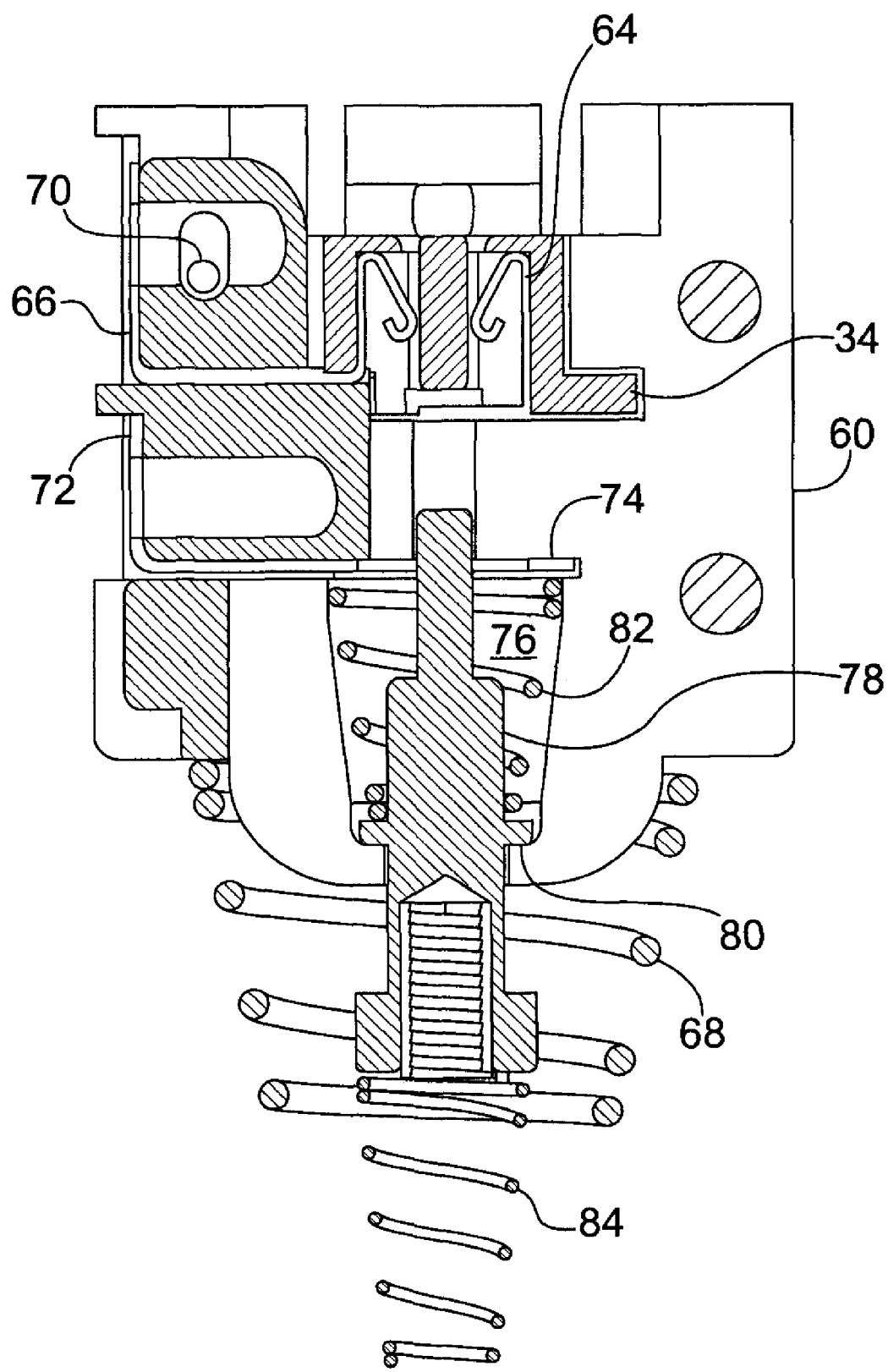
FIG. 5 is a cross-sectional view of the connection module of FIG. 4.

More views of the connection module 32 are shown in FIG. 4 and FIG. 5. The connection module 32 comprises two clamshell housing pieces 60 and 62. The housing pieces 60 and 62 are formed to capture several conductive components therein as follows. The lamp base 34 fits within a recess formed between the two housing pieces 60 and 62. The lamp base is preferably composed of a liquid crystal polymer material having relatively high heat resistance to act as a barrier to heat generated by the lamp and to provide a heat shield for the connection module. The connection module 32 may be made of an acetol polymer material such as DELRIN, which provides suitable mechanical performance for moving parts situated therein. On the rear surface of the lamp base 34, there is provided a conductive contact member 64 for the positive terminal of the lamp circuit. Extending from one side of the lamp base 34, and held within a recess formed in the housing pieces, a negative contact member 66 extends within the connection module toward the side of the module. A terminal portion of the contact member is bent upward and has a receiving ring formed therein to connect with the negative contact screw 40. A conical spring 68 is positioned to extend from the rear of the connection module 32 to connect with the negative terminal of the battery assembly. The conical spring 68 has a contact arm portion 70 that runs through the connection module to connect with the negative contact member 66. When the flashlight is assembled with the battery assembly in place, continuous compressive contact is maintained between the negative terminal at the forward end of the battery and the conical spring 68, so that a continuous charging connection is provided between the negative contact screw and the negative terminal of the battery.

A positive contact member 72 has a ring portion for connecting with the positive contact screw. The positive contact member is positioned in the connection module and extends to provide a circular contact ring 74 which is aligned within the connection module at a position to the rear of the lamp base 34. A plunger cavity 76 is formed in the rear of the connection module between the clamshell pieces 60 and 62. A plunger 78 is slidably captured in the connection module by a rim 80 formed thereon. A rear portion of the plunger 78 extends out of the rear of the connection module. Within the plunger cavity 76, a spring 82 is compressed between the rim 80 and the rear of the circular contact ring 74. Outside of the plunger cavity, the rear of the plunger 78 connects with a spring 84 that extends rearwardly from the connection module to connect with the positive terminal of the battery assembly. The spring 84 is thus maintained in continuous compressive contact with the positive terminal of the battery, so that at all times a conductive path is provided between the positive terminal of the battery and the positive charging contact on the exterior of the flashlight.

The plunger 78 has a tip portion aligned with the rear of the lamp base 34, and the positive lamp contact thereon. The plunger is urged rearwardly within the plunger cavity 76, by the spring 82, so that in a first position, the tip of the plunger 76 is maintained out of contact with the positive lamp contact. Referring again to FIG. 3, it can be seen that by depressing the slide member 54 into the rear of the tail assembly, the slide member 54 urges the battery assembly forward within the barrel 16. Thus, when the slide member 54 is so depressed, the movement of the battery assembly compresses both springs 84 and 82, to urge the tip of the plunger into contact with the positive lamp contact on the rear of the lamp base. The lamp may therefore be intermittently switched on and off by holding the flashlight in the fingers of one hand, and depressing the slide member with the thumb of the same hand.

To maintain the lamp in a continuous "on" condition, the tail housing 50 may be rotated into the rear of the barrel on the threads 52, so that the springs 84 and 82 are again compressed to move the plunger tip into contact with the positive lamp contact. Thus, the configuration herein described provides intermittent or continuous switching of the lamp.

Figure 6:
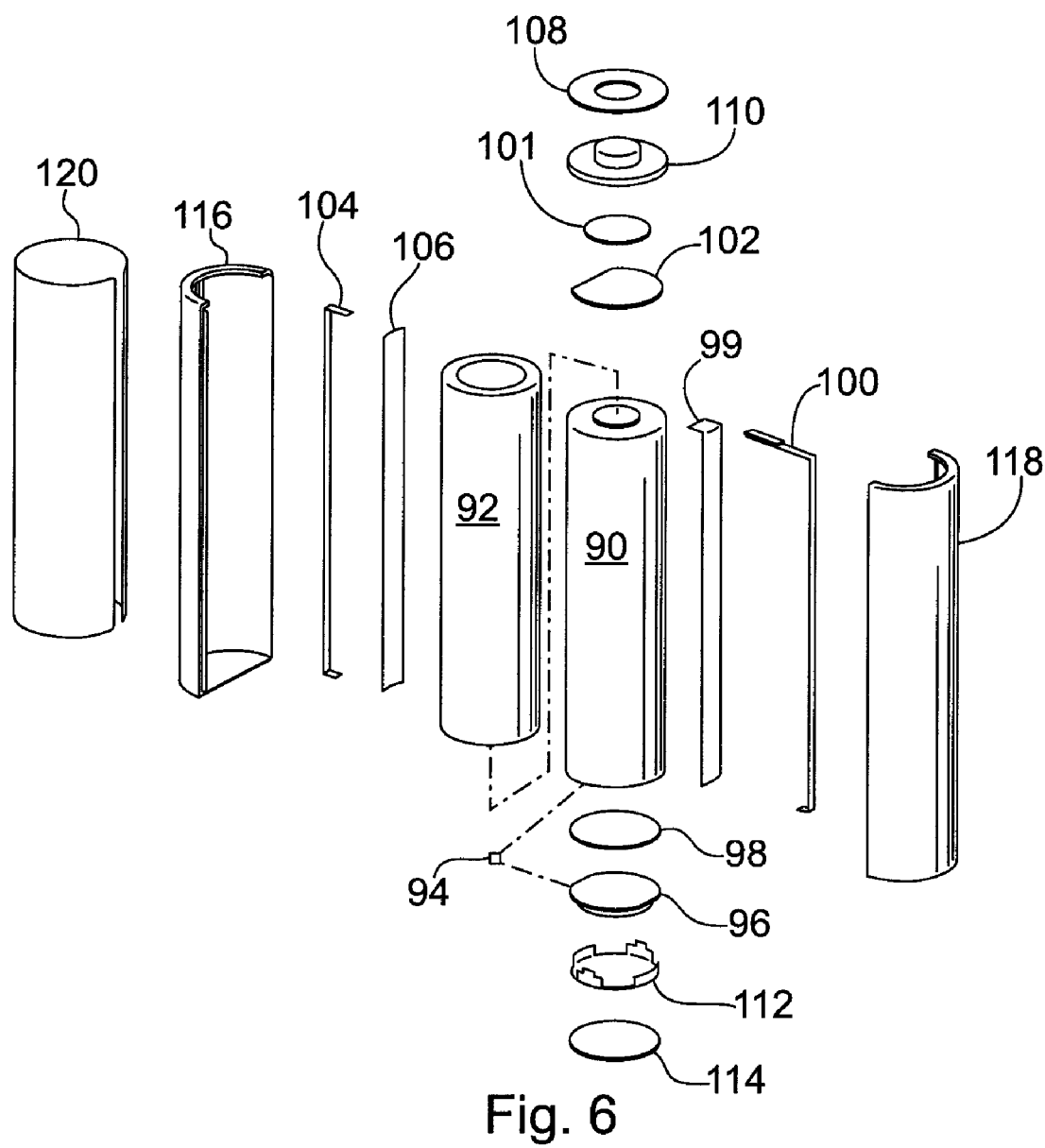
FIG. 6 is an exploded view of a battery assembly utilized in the flashlight of FIG. 3.

The battery assembly is shown in an exploded view in FIG. 6. The preferred cell for the battery is a Lithium-ion rechargeable cell. The battery assembly provides two battery terminals 108 and 101 exposed at the forward end thereof in a concentric arrangement as viewed from the forward end. A battery protection circuit disconnects the Li-ion cell from the lamp circuit from further charging when the cell is fully charged, and also disconnects the cell from the lamp circuit when the charge is depleted below a predetermined threshold. The battery assembly is constructed as follows. A Li-ion rechargeable cell 90 is first provided with a shrink-wrap insulating jacket 92. A conductive strap 94 is connected with the cell contact at the negative end of the cell and with a protection circuit board 96. An insulating spacer 98 is positioned between the rear of the cell 90 and the forward side of the circuit board 96. A length of insulating tape 99 is applied to one side of the jacket 92, and a conductive strap 100 is connected with the circuit board 96 at the rear of the assembly, and extends to the forward end of the assembly for connection to the positive cell contact at the forward end. The forward end of the strap 100 extends across the positive cell contact, and then connects with a positive battery contact terminal member 101. The strap 100 is bent backwards, and an insulating spacer 102 is positioned between the positive contact of the cell and the positive contact terminal member.

On the other side of the jacket 92, another strap 104 is connected to the negative cell contact, and is positioned over an insulating strip 106 positioned on that side of the jacket. The forward end of the strap 104 is connected to an annular negative battery contact terminal 108 at the forward end of the cell. The annular negative terminal 108 is positioned on an insulating member 110 which has a hollow cylindrical vertical extension formed therein for guiding the spring into contact with the positive contact terminal 101.

A disk-shaped low-profile housing 112 is placed over the rear side of the protection circuit, and an insulating spacer 114 is placed on the rear side of the housing, to mechanically protect the protection circuit. Finally, the sheathed cell, strap, and protection circuit arrangement is enclosed in a rigid plastic shell formed by shell members 116 and 118. The shell is closed at the rear end, and is open at the forward end to permit the springs to connect with the respective contacts. An adhesive label 120 may be placed over the shell to hold the shell members together.

The terms used here and above are intended by way of exemplary description, and not of limitation. There is no intent for such terms of description to otherwise limit the scope of the appended claims.

We claim:

1. A flashlight assembly, comprising:
   a housing having a battery compartment;
   a lamp head providing a light source, connected with the housing;
   a lithium-ion rechargeable battery cell positionable within the compartment;
   a control circuit operable to control charging and discharging of the battery cell;
   a battery charger operable to electrically engage the battery cell to re-charge the battery cell;
   wherein the control circuit is operable to disconnect the lithium-ion battery cell from the light source in response to the charge in the lithium-ion battery cell depleting below a pre-determined lower threshold, and wherein the control circuit is operable to disconnect the lithium-ion battery cell from electrical connection with the battery charger when the lithium-ion battery is connected with the battery charger and the charge in the lithium-ion battery reaches a pre-determined upper threshold.

2. The flashlight system of claim 1 wherein the upper threshold corresponds to the lithium-ion battery being fully charged.

3. The flashlight system of claim 1 comprising a battery housing for housing the battery cell and a protective housing separate from the battery housing to protect the control circuit.

4. A flashlight, comprising:
   a housing having a battery compartment;
   a light source adjacent a first end of the housing;
   a first charging contact;
   a second charging contact;
   a rechargeable lithium-ion battery operable to store a charge and configured to be positioned in the battery compartment, wherein the battery has a first contact and a second contact for charging the battery, wherein the first contact of the battery is electrically coupled with the first charging contact and the second contact of the batter is electrically coupled with the second charging contact, and wherein the light source is electrically coupled with the first and second contacts of the battery;
   a controller circuit serially connected with the first battery contact, wherein the controller circuit is operable to disconnect the lithium-ion battery cell from the light source in response to the charge in the lithium-ion battery depleting below a pre-determined lower threshold, and wherein the control circuit is operable to disconnect the lithium-ion battery cell from electrical connection with the first charging contact when the lithium-ion battery is connected with a battery charger and the charge in the lithium-ion battery reaches a pre-determined upper threshold.

5. The flashlight of claim 4 wherein the controller is separate from the lithium-ion battery.

6. The flashlight of claim 4 wherein the first and second contacts are configured to cooperate with contacts of the battery charger for charging the battery.

7. The flashlight of claim 4 comprising a first electrical path extending from the rearward end of the flashlight to a forward end of the flashlight and in electrical communication with the light element, wherein the first electrical path includes the first battery contact.

8. The flashlight of claim 7 comprising a second electrical path extending from the rearward end of the flashlight to a forward end of the flashlight and in electrical communication with the light element, wherein the second electrical path includes the second battery contact.

9. The flashlight of claim 4 comprising a switch for controlling operation of the flashlight, the switch being positioned adjacent a rearward end of the housing, remote from the first end of the housing.

10. A flashlight, comprising:
    a housing having a battery compartment;
    a lamp head connected to a first end of the housing, wherein the lamp head comprises a light element;
    a rechargeable lithium-ion battery operable to store a charge and configured to be positioned in the battery compartment, wherein the battery has a first contact and a second contact;
    a first electrical path extending substantially the length of the battery compartment from the rearward end of the battery to the first end of the housing;
    a second electrical path extending substantially the length of the battery compartment from the rearward end of the battery to the first end of the housing;
    a switch for controlling operation of the flashlight, the switch being positioned adjacent a rearward end of the housing, remote from the first end of the housing;
    a circuit board comprising a controller circuit serially connected with the battery, wherein the controller circuit is operable to disconnect the lithium-ion battery cell from the light element in response to detection of a first characteristic and further operable to disconnect the lithium-ion battery cell from a separate charging device in response to detection of a second characteristic that is different from the first characteristic, wherein neither the first nor the second characteristic comprise operation of the switch.

11. The flashlight of claim 10 wherein the first characteristic comprises the charge in the lithium-ion battery depleting below a pre-determined lower threshold.

12. The flashlight of claim 11 wherein the second characteristic comprises the charge in the lithium-ion battery reaching a pre-determined upper threshold while the battery is in electrical connection with a battery charger.

13. The flashlight of claim 10 wherein the switch is an axially displaceable switch biased in a rearward direction.

14. The flashlight of claim 10 wherein the battery comprises a housing and the flashlight comprises a housing separate from the battery housing and configured to house and protect the control circuit.

* * * * *